UNITED STATES PATENT OFFICE

WALTER KROPP, OF ELBERFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CONDENSATION PRODUCT OF ALPHA, BETA DISUBSTITUTED ACROLEINS WITH PRIMARY AROMATIC AMINES

No Drawing. Application filed September 1, 1928, Serial No. 303,615, and in Germany August 6, 1925.

The present invention relates to the manufacture of technically valuable compounds obtainable by condensing alpha-beta-substituted acroleins with primary aromatic amines.

In accordance with the invention an alpha-beta-substituted acrolein, more particularly an acrolein of the general formula

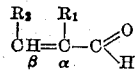

wherein $R_1$ means alkyl, and $R_2$ stands for alkyl or phenyl, is caused to be reacted upon by a primary aromatic amine as for instance aniline, meta- or para-toluidine, alpha-naphthyl-amine etc. in the presence of a compound of an organic or inorganic acid whereby these compounds will probably exert condensing properties.

The reaction may advantageously be performed with molecular quantitities of aldehyde and amine but in many cases it will be of advantage to work with an excess of the aldehyde, which excess can easily be removed after the condensation according to known methods. The reaction already begins at room temperature and is in the most cases highly exothermic, so that an external heating will be unnecessary but it may be mentioned, that the best results are obtained at temperatures between 90–120° C. and that the character of the final products is somewhat dependent from the temperature employed as well as from the amount of the acidic substance used. Among the acid substances I prefer fatty acids, especially those which contain from 1 to 18 carbon atoms, as for instance formic acid, acetic acid, propionic acid, butyric acid, stearic acid etc., but it is to be understood that also the use of inorganic acids and other organic acids such as hydrochloric acid, salicylic acid, cinnamic acid, aromatic sulfonic acids, oxalic acid, succinic acid etc. is within the limits of my invention. The amount of acid advantageously to be added to the reaction mixture varies in wide limits, 5–25% of the molar weight of the latter to each molar weight of the aldehyde applied being mentioned by way of example.

Instead of starting from the aldehydes themselves there may be used such substances as yield the aldehydes during the reaction, such as the oximes of the aldehydes, products having the character of the corresponding aldoles and the like. Also it is possible to work in the presence of a suitable organic solvent, such as benzene, toluene, etc., without departing from my invention.

The products thus obtainable form yellowish to reddish brown oils nearly insoluble in water, soluble in the usual organic solvents. They are excellent accelerators in vulcanization processes, especially in admixture with lamp black for instance gas lamp black. I do not know at present the exact structure of the new compounds but they probably are formed by interaction of one mol of the aldehyde with one mol of the amine whereby water is eliminated. It may be stated that the new compounds described herein are not identical with the compounds obtainable from the same starting materials and according to the same process but without the addition of an acid or with the addition of another condensing agent. The difference in the properties of the products may be proved by the fact that the tensile strength of the materials obtained by the vulcanization of rubber or artificial rubber-like masses in the presence of carbon black is substantially greater, when applying as accelerators the products described in the present application, than when applying the similar products obtainable without the addition of an acid or with the addition of another condensing agent. For the use of the compounds as accelerators it is not necessary to employ them in a pure state. When an excess of aldehyde has been used, the same may remain in the final product as well as a part of the acid employed, without diminishing the accelerating action. Also when starting from an aldehyde in a rather impure state the final product will show in the most cases the same good accelerating properties as the product obtained from the corresponding pure aldehyde.

The following examples illustrate my invention without limiting it thereto, the parts being by weight

Example 1

To 8 parts of formic acid 200 parts of alpha-ethyl-beta-propylacrolein (b. p. 172–174° C.) and then, while stirring, 90 parts of aniline are added. The temperature of the reaction mixture rises to about 50° C. without external heating while water begins to separate. The temperature is caused to rise to 110° C. (interior temperature) while refluxing and is maintained at this degree for 3–3½ hours, care being taken that the water formed during the reaction is allowed to distill off, while the other refluxing substances return to the reaction vessel. Now the excess of aldehyde and acid are removed by steam-distillation, the remaining oil is separated from the water while still warm, anhydrous sodium sulfate is added and then filtered. A light yellow oil is thus obtained, nearly insoluble in water, easily soluble in benzene, benzine, acetic ester and the like.

Example 2

A crude alpha-ethyl-beta-propylacrolein is prepared by stirring together 1 part of norm. butylaldehyde and 5 parts of soda lye (2%) at ordinary temperature until the butylaldehyde has disappeared, separating the reaction product from the soda lye, washing with aqueous sodium chloride solution and water and drying with anhydrous sodium sulfate. To 150 parts of this product 9 parts of glacial acetic acid and 90 parts of aniline are added. The temperature soon begins to raise with separation of water. The temperature is maintained at 105–115° C. for 3–3½ hours and the reaction product further treated as described in Example 1. A reddish yellow oil is thus obtained nearly insoluble in water, soluble in the usual organic solvents, exerting strong accelerating properties in vulcanization processes.

Example 3

150 parts of alpha-ethyl-beta-propyl acrolein are mixed with 13 parts of n-butyric acid, 90 parts of aniline are added and the mixture is heated to 112° C. (interior temperature) for 2½ hours. The reaction mixture is now successively shaken with an aqueous ammonia- and sodium chloride solution and the resulting mixture is heated in vacuo to 115–120° C. (external temperature), whereby water is allowed to distill off. The remaining oily substance is now stirred with about 10% of fuller's earth at about 70° C., after which time the product is filtered. There remains an oil of yellowish to reddish color, exerting good accelerating properties in vulcanization processes.

Example 4

200 parts of crude alpha-ethyl-beta-propyl acrolein obtained as described in Example 2, are mixed with 9 parts of glacial acetic acid, and a solution of 90 parts of aniline in 180 parts of benzene is added. The mixture is heated to 80° C. for 30 minutes, the benzene distilled off after that time and the remaining liquor heated for a further 30 minutes to 120° C. Now the excess of aldehyde and acid are removed by steam distillation and the resulting oil is dried and distilled in vacuo (8 mm.). The fraction distilling over between 160–200° C. forms a yellowish oil, which is insoluble in water, but soluble in the usual organic solvents, and shows especially good properties as accelerator in vulcanization processes.

Example 5

150 parts of alpha-ethyl-beta-propyl-acrolein are mixed with 7 parts of glacial acetic acid and 90 parts of aniline are added to this mixture at room temperature. The mixture is now heated to 106° C. for 3 hours. The product thus obtainable is repeatedly washed with aqueous sodium chloride solution and dried. The product, which still contains ethyl-propyl-acrolein, may be used in this state as a vulcanization accelerator.

Example 6

9 parts of stearic acid are dissolved in 100 parts of alpha-ethyl-beta-propyl-acrolein, 45 parts of aniline are added and the mixture is heated to 110° C. for three hours. Now the excess of aldehyde is removed by steam distillation and the remaining oily substance dried by means of anyhdrous sodium sulfate. It forms a reddish oil, insoluble in water.

Example 7

150 parts of alpha-ethyl-beta-propyl-acrolein are mixed with 5 parts of glacial acetic acid. Into this mixture 51 parts of p-toluidine are allowed to drop in at 105° C. which temperature is still further maintained for about 4 hours. The reaction mixture is now cooled, shaken with an aqueous ammonia solution and water and distilled in vacuo at 120° C. (external temperature) until the components of the mixture distilling over under these conditions are removed. It remains an oil, soluble in benzene, acetone and other organic solvents.

Example 8

To a mixture of 100 parts of alpha-ethyl-beta-propyl-acrolein and 2.5 parts of glacial acetic acid, 60 parts of technical m-toluidine are added at 105° C. and the reaction mixture is maintained at this temperature for 2–3 hours. After that time the reaction mixture is cooled, shaken with diluted soda lye and washed with water until the soda lye is completely removed. The excess of aldehyde and the water are then distilled off in vacuo at about 120° C. It remains a reddish liquid, exerting good accelerating properties.

Example 9

A mixture of 126 grams of alpha-ethyl-beta-propylacrolein 126 grams of alpha-napthylamine, 5 ccm. of glacial acetic acid and 800 ccm. of benzene is boiled for 6 hours on the water bath. Then the mixture is subjected to steam distillation and the remaining reddish brown oil is dried by means of anhydrous sodium sulfate.

Example 10

13 parts of alpha-n-amyl-beta-phenyla-crolein are mixed with 0.5 parts of glacial acetic acid and 5 parts of aniline, whereby self-heating and separation of water occurs. The mixture is maintained for about 4–5 hours at a temperature of 105° C., subjected to steam distillation, and the remaining substance dried by means of anhydrous sodium sulfate. It forms a yellowish oil, insoluble in water. Instead of alpha-n-amyl-beta-phenyl acrolein other acroleins may be used for example alpha-isoproply-beta-isobutyl-acrolein, alpha-methyl-beta-ethylacrolein and the like.

This is a continuation in part of my co-pending application Ser. No. 92,952, filed March 6th, 1926.

I claim:—

1. Process which comprises reacting upon an acrolein of the probable formula

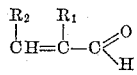

wherein $R_1$ means alkyl, and $R_2$ stands for alkyl or phenyl, with a primary aromatic amine in the presence of an acid.

2. Process which comprises reacting upon an acrolein of the probable formula

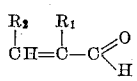

wherein $R_1$ means alkyl, and $R_2$ stands for alkyl, or phenyl, with a primary aromatic amine in the presence of an organic acid.

3. Process which comprises reacting upon an acrolein of the probable formula

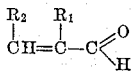

wherein $R_1$ means alkyl, and $R_2$ stands for alkyl or phenyl, with a primary aromatic amine in the presence of a fatty acid containing not more than 18 carbon atoms.

4. Process which comprises reacting upon an acrolein of the probable formula

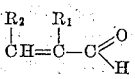

wherein $R^1$ means alkyl, and $R_2$ stands for alkyl or phenyl, with a primary aromatic amine at a temperature between 90–120° C. in the presence of an organic acid in a quantity of 5–25% of the molar weight of the latter to each molar weight of the aldehyde applied.

5. Process which comprises reacting upon an acrolein of the probable formula

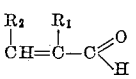

wherein $R_1$ means alkyl, and $R_2$ stands for alkyl or phenyl, with a primary aromatic amine at a temperature between 90–120° C. in the presence of a fatty acid containing not more than 18 carbon atoms in a quantity of 5–25% of the molar weight of the latter to each molar weight of the aldehyde applied.

6. Process which comprises reacting upon an acrolein of the probable formula

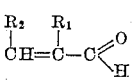

wherein $R_1$ means alkyl, and $R_2$ represents an alkyl or phenyl radical at a temperature between 90–120° C. with a compound of the group consisting of aniline, m-toluidine and p-toluidine in the presence of a fatty acid containing not more than 18 carbon atoms in a quantity of 5–25% of the molecular weight of the latter to each molar weight of the aldehyde applied.

7. Process which comprises reacting upon 150 parts by weight of crude alpha-ethyl-beta-propyl-acrolein with 90 parts by weight of aniline at a temperature of 105–115° C. in the presence of 9 parts by weight of glacial acetic acid for 3–3½ hours, removing the excess of aldehyde, separating the remaining oil, and drying it.

8. The new products obtainable according to the process claimed in claim 1, which products are yellowish to reddish-brown oils nearly insoluble in water, soluble in the usual organic solvents and being accelerators in vulcanizing processes.

9. The new products obtainable according to the process claimed in claim 4, which products are yellowish to reddish-brown oils nearly insoluble in water, soluble in the usual organic solvents and being accelerators in vulcanizing processes.

10. The new products obtainable according to the process claimed in claim 6, which products are yellowish to reddish-brown oils nearly insoluble in water, soluble in the usual organic solvents and being accelerators in vulcanizing processes.

11. The new product obtainable according to the process claimed in claim 7, which product forms a reddish yellow oil nearly insoluble in water, soluble in the usual organic solvents, exerting strong accelerating properties in vulcanization processes.

In testimony whereof I have hereunto set my hand.

WALTER KROPP. [L. S.]

CERTIFICATE OF CORRECTION.

Patent No. 1,834,849.   Granted December 1, 1931, to

WALTER KROPP.

It is hereby certified that error appears in the printed specification of the above numbered patent requiring correction as follows: Page 1, line 26, after "methods." insert the sentence It is to be understood that one molecule of the aldehyde reacts with one molecule of the amine regardless of the proportions used.; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.